UNITED STATES PATENT OFFICE.

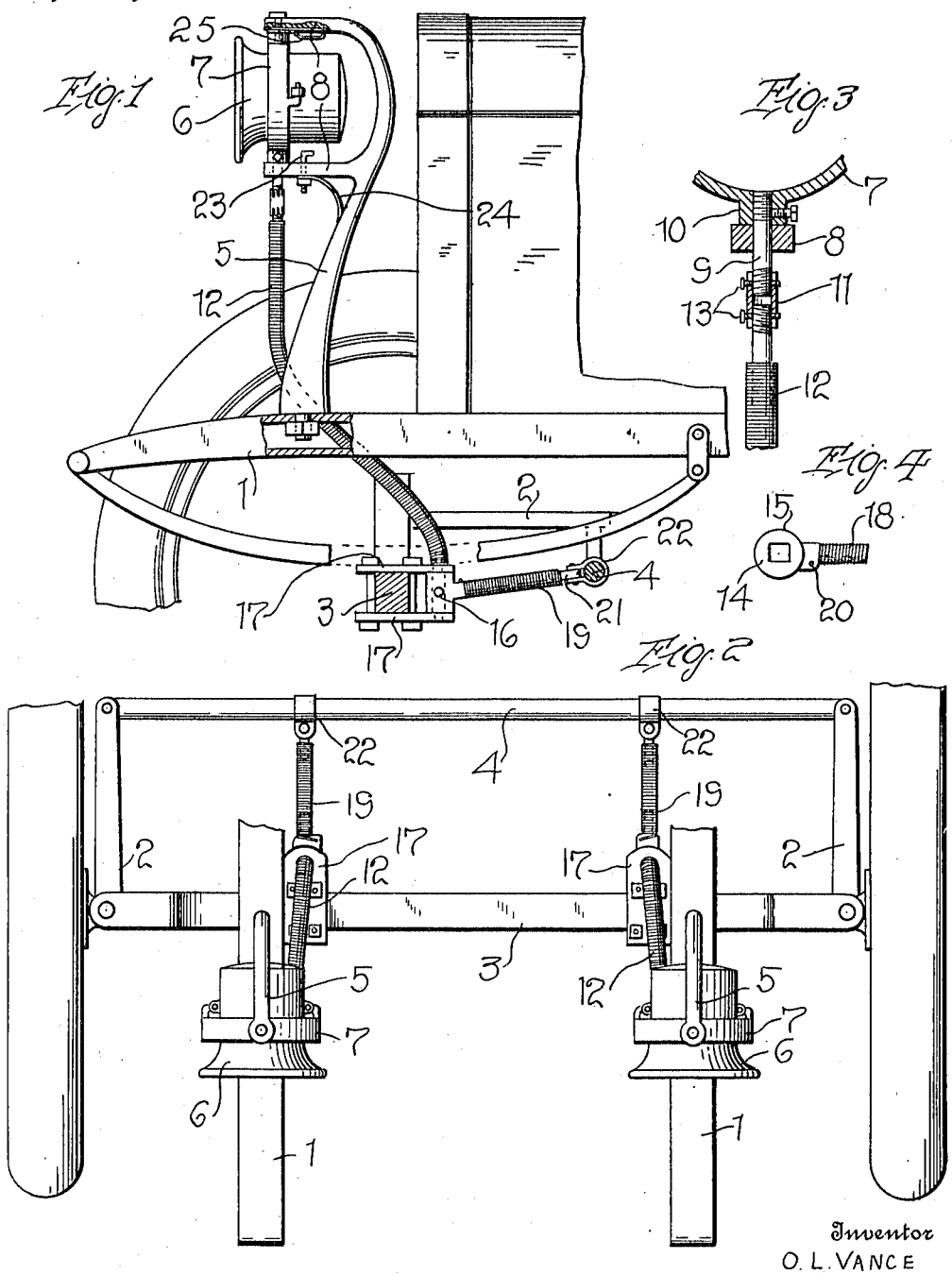

OSCAR L. VANCE, OF DECATUR, INDIANA.

AUTOMOBILE-HEADLIGHT.

1,099,217.  Specification of Letters Patent.  Patented June 9, 1914.

Application filed October 29, 1913. Serial No. 798,065.

*To all whom it may concern:*

Be it known that I, OSCAR L. VANCE, a citizen of the United States, residing at Decatur, in the county of Adams and State of Indiana, have invented certain new and useful Improvements in Automobile - Headlights, of which the following is a specification, reference being had to the accompanying drawings.

To those familiar with the operation of automobiles, it is well known that difficulties are experienced with the ordinary headlights, owing to the fact that they are held in a stationary manner on their supporting posts or pedestals, and consequently, in rounding a curve, the beams of light do not follow the path of the vehicle, but are directed at a tangent thereto, and hence do not illuminate the road in advance of the machine.

With a knowledge of these conditions, my invention has for its primary object a simple and efficient machine, whereby the headlights will be caused to automatically turn with the front or steering wheels to the right or to the left, as the case may be, when the vehicle is rounding a curve, so that the beams of light will at all times be maintained directly in advance of the path of travel and the accidents which frequently happen, owing to the lack of illumination on a curve, will thereby be avoided.

A further object of the invention is an improved dirigible headlight mechanism, the parts of which may be easily constructed and readily assembled and applied to any conventional type of automobile without material changes or alterations therein.

A still further object of the invention is a device of this character, in which the parts are so arranged that all rattling of the lamp or other parts due to the jarring of the vehicle along the road will be prevented and whereby the dirigible headlight mechanism will tend to assist in maintaining the front or steering wheels in line with the body portion of the vehicle, whereby the steering operation on a straight road will be facilitated, and the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which—

Figure 1 is a sectional side elevation of a portion of an automobile having my invention applied thereto. Fig. 2 is a plan view, and, Figs. 3 and 4 are detail views of parts hereinafter specifically described.

Corresponding and like parts are referred to in the following description and designated in all of the views of the accompanying drawing by like reference characters.

Referring to the drawing, the numeral 1 designates the side bars of an automobile frame or body, 2 designates the rearwardly projecting steering knuckle arms, 3 the front axle and 4 the rod which connects together the rear ends of the steering knuckle arms 2 for simultaneous and corresponding movement. 5 designates the headlight supporting posts or pedestals. All of these parts may be of any desired or conventional design or construction. They are selected merely for the purposes of illustration.

In carrying out my invention, particularly in that embodiment thereof illustrated in the accompanying drawing, I pivotally mount the headlights 6 to turn about vertical axes, said headlights in the present instance being detachably supported, as best illustrated in Fig. 1, in rings 7 which are pivotally mounted at vertically alined diametrically disposed points in the arms 8 that are formed on the upper ends of the posts or pedestals 5. It is here to be understood that these posts or pedestals may be of any desired size, shape or construction, according to the particular automobile to which the invention may be applied. The lower pivot for the ring 7 consists of a vertically disposed spindle 9 which is threaded at its upper end for engagement with the boss 10 formed on the ring 7, as best illustrated in Fig. 3, the ring being secured to the post after being threaded thereon, by means of a set screw, as shown. The spindle 9 is mounted to turn about its longitudinal axis in the lower arm 8 of the pedestal 5, and it has its lower threaded end connected by a union 11 with right and left end threads to the upper threaded end or extremity of a flexible shaft 12, whereby the shaft and spindle may be easily connected together or uncoupled, one from the other, without removing or disturbing any of the other parts. Preferably, the union is locked to the spindle 9 and the upper extremity of the flexible shaft 12 by means of the bolts 13, as best illustrated in Fig. 3.

The flexible shaft 12 extends down from the spindle 9 to the front axle 3 of the vehicle where it is inserted in a non-circular opening formed in the head 14 of a lever 15, being fixed therein by means of a transversely extending bolt 16, as indicated in Fig. 1. The head 14 of the lever 15 is mounted to turn about a vertical axis in and between the rearwardly extending ends of upper and lower attaching plates 17 clamped by tie bolts or similar fastening devices to the axle 3, as shown, and the arm of the lever 15 extends normally in a rearward direction and is threaded, as indicated at 18, to engage the convolutions of a helical spring 19 which is threaded on the arm 18 and has one end inserted in an opening 20 formed in the arm near the head 14, as clearly indicated in Fig. 4. The rear end of the spring 19 is provided with an apertured ear 21 which is pivotally mounted between the ends of a clip 22 designed to encircle the connecting rod 4.

From the foregoing description in connection with the accompanying drawing, the operation of my improved dirigible headlight mechanism will be apparent, it being understood that the parts hereinbefore described are duplicated for both lamps. In the practical operation of the mechanism as the front or steering wheels of the vehicle are turned to the right or to the left, it is obvious that the corresponding movement of the connecting rod 4 will draw the springs 19 to the left or to the right, as the case may be, and a movement will thus be imparted to the flexible shaft 12 and will be transmitted thereby to the headlights 6. The resilience of the springs 19 will compensate for the movement of the levers 15 and clips 22 about different centers, while at the same time, this construction and arrangement of the parts will not only, in connection with the flexible shafts 12 and the particular mounting of the lamps, as hereinbefore described, prevent all rattling due to the jarring of the vehicle, but the springs 19 themselves will tend to return the front or steering wheels to their normal straight position in line with the body of the vehicle and thereby facilitate the steering operation.

It will thus be seen that I have provided a simple, durable and efficient construction of dirigible headlight mechanism which is composed of comparatively few parts that may be easily manufactured and readily assembled and which may be readily applied to automobiles or similar vehicles of any ordinary or conventional type.

Preferably, in order to provide for the conducting of gas or an electric current to the headlight 6, I mount a tube 23 in the lower arm 8 of the supporting post or pedestal 5, the same being held in position by a nut, as best illustrated in Fig. 1, and a brace 24, it being understood that a rubber tube or similar flexible connection or wires, as the case may be, will extend from the tube 23 into the lamp, the said tube being placed relatively close to the axis of the lamp or headlight, whereby comparatively little movement will be made at this point and a correspondingly short connection will suffice between the supply tube 23 and the lamp itself.

It is to be understood that the invention is not limited to the use of the rings 7 for the direct support of the lamps or headlights 6, but that the lamps may be movably supported in any other desired way. Preferably, in order to assist in preventing the headlight or its supporting parts from rattling in the bearings at the upper end of the standard or pedestal, particularly in case of any wear, I provide a leaf spring 25 shown in Fig. 1. This spring is doubled upon itself and perforated at its end to receive the stud or pivot pin mounted in the extremity of the upper arm 8, as shown, and its upper member preferably lies in a groove formed in the lower side of said arm, the two members of the spring having a tendency to open, as is manifest, whereby the parts will always be maintained in proper bearing relation, and all possibility of rattling will be precluded.

While the accompanying drawing illustrates what I believe to be the preferred embodiment of my invention, it is to be understood that the invention is not limited thereto, but that various changes may be made in the construction, arrangements and proportions of the parts without departing from the scope of the invention, as defined in the appended claims.

What I claim is:—

1. In dirigible headlight mechanism, the combination with a headlight mounted to turn, of a flexible shaft connected thereto and adapted to turn the same, a lever operatively connected to said shaft, and an expansion spring connected to said lever and mounted to be operatively connected to a portion of the steering mechanism of an automobile, for the purpose specified.

2. The combination with the front axle and steering knuckle connecting rod of a vehicle, of a headlight supported on the vehicle for a turning movement to the right and to the left, a flexible shaft operatively connected to the headlight to turn the same, a lever carried by the axle and connected to said shaft, a clip adapted to be attached to said connecting rod, and an expansion spring connecting said clip to the lever, as and for the purpose set forth.

3. The combination with the front axle and steering knuckle connecting rod of a vehicle, of a headlight support, a headlight mounted for a turning movement thereon to the right and to the left, a flexible shaft operatively connected to the headlight to turn the same, a lever connected to the lower end of the flexible shaft, means for supporting said lever on the axle, the lever being provided with a rearwardly extending threaded arm, a coiled expansion spring threaded on said arm and fixed to the lever, said spring being provided at its normally rear end with an apertured ear, and a clip adapted to be fastened to the connecting rod and to which the ear is pivotally connected.

4. The combination with the front axle and steering knuckle connecting rod of a vehicle, of a headlight support, a headlight mounted to turn therein to the right and to the left, the supporting means for said headlight including a vertically disposed spindle, a flexible shaft, a union detachably connecting the lower end of said spindle to the upper end of the shaft, a lever, means for connecting said lever to the front axle, said lever being connected to the lower end of the shaft to turn the same, a clip adapted to be secured to the connecting rod, and a coiled expension spring connected to said lever and pivotally connected to the clip.

In testimony whereof I hereunto affix my signature in the presence of two witnesses.

OSCAR L. VANCE.

Witnesses:
E. L. WHITE,
FREDERICK S. STITT.

---

Copies of this patent may be obtained for five cents each, by addressing the "Commissioner of Patents, Washington, D. C."